US010628269B2

(12) United States Patent
Deligeon et al.

(10) Patent No.: US 10,628,269 B2
(45) Date of Patent: Apr. 21, 2020

(54) METHOD FOR DETECTING AN UNCORRECTABLE ERROR IN A NON-VOLATILE MEMORY OF A MICROCONTROLLER

(71) Applicants: Continental Automotive France, Toulouse (FR); Continental Automotive GmbH, Hannover (DE)

(72) Inventors: Vincent Deligeon, Toulouse (FR); Pierre Boucher, Toulouse (FR)

(73) Assignees: Continental Automotive France, Toulouse (FR); Continental Automotive GmbH, Hannover (DE)

( * ) Notice: Subject to any disclaimer, the term of this patent is extended or adjusted under 35 U.S.C. 154(b) by 158 days.

(21) Appl. No.: 15/754,125

(22) PCT Filed: Aug. 26, 2016

(86) PCT No.: PCT/EP2016/001443
§ 371 (c)(1),
(2) Date: Feb. 21, 2018

(87) PCT Pub. No.: WO2017/036584
PCT Pub. Date: Mar. 9, 2017

(65) Prior Publication Data
US 2018/0246787 A1  Aug. 30, 2018

(30) Foreign Application Priority Data
Aug. 28, 2015  (FR) ...................... 15 58019

(51) Int. Cl.
*G06F 11/14* (2006.01)
*G06F 11/07* (2006.01)
*G06F 11/10* (2006.01)

(52) U.S. Cl.
CPC ...... *G06F 11/1469* (2013.01); *G06F 11/0793* (2013.01); *G06F 11/1048* (2013.01); *G06F 11/141* (2013.01); *G06F 2201/82* (2013.01)

(58) Field of Classification Search
CPC ............. G06F 11/1469; G06F 11/0793; G06F 11/1048; G06F 11/141; G06F 2201/82
See application file for complete search history.

(56) References Cited

U.S. PATENT DOCUMENTS

| 10,387,281 B2* | 8/2019 | Singidi | ................ G11C 29/883 |
| 2002/0069376 A1* | 6/2002 | Gregg | ................... G06F 3/0619 |
| | | | 714/6.12 |

(Continued)

FOREIGN PATENT DOCUMENTS

| CN | 101527171 A | 9/2009 |
| CN | 101866698 A | 10/2010 |

(Continued)

OTHER PUBLICATIONS

JMP (x86 instruction). Wikipedia. Retrieved on Jul. 26, 2019. Retrived from the Internet <URL: https://en.wikipedia.org/wiki/JMP_(x86_instruction)>.*

(Continued)

*Primary Examiner* — Paul Contino
(74) *Attorney, Agent, or Firm* — RatnerPrestia

(57) ABSTRACT

A method for detecting and managing an uncorrectable error in a non-volatile memory of a microcontroller, the microcontroller having a read interface, an exception manager, and a set of internal registers and execution parameters that form a low-level context of the microcontroller. The method provides for backing up the low-level context of the microcontroller, as well as restoring the context in the event that an exception is raised during an attempt to read data from the (Continued)

non-volatile memory, provided that a specific strategy for detecting and managing an uncorrectable error is activated.

8 Claims, 1 Drawing Sheet

(56) References Cited

U.S. PATENT DOCUMENTS

| | | | |
|---|---|---|---|
| 2002/0162050 A1* | 10/2002 | Milojicic | G06F 11/073 714/20 |
| 2004/0019835 A1 | 1/2004 | Marisetty et al. | |
| 2006/0179358 A1* | 8/2006 | Cordero | G06F 11/1441 714/5.11 |
| 2007/0294517 A1* | 12/2007 | Ayrignac | G06F 9/30043 712/228 |
| 2010/0205509 A1 | 8/2010 | Kirschner et al. | |
| 2010/0268988 A1 | 10/2010 | Kurnik et al. | |
| 2010/0318845 A1 | 12/2010 | Kohiga | |
| 2015/0149840 A1* | 5/2015 | Alhussien | H03M 13/1125 714/719 |

FOREIGN PATENT DOCUMENTS

| | | |
|---|---|---|
| CN | 103092717 A | 5/2013 |
| KR | 20060124249 A | 12/2006 |
| WO | 2012058328 A1 | 5/2012 |
| WO | 2013042972 A2 | 3/2013 |

OTHER PUBLICATIONS

International Search Report and Written Opinion for International Application No. PCT/EP2016/001443, dated Dec. 19, 2016, 9 pages.

* cited by examiner

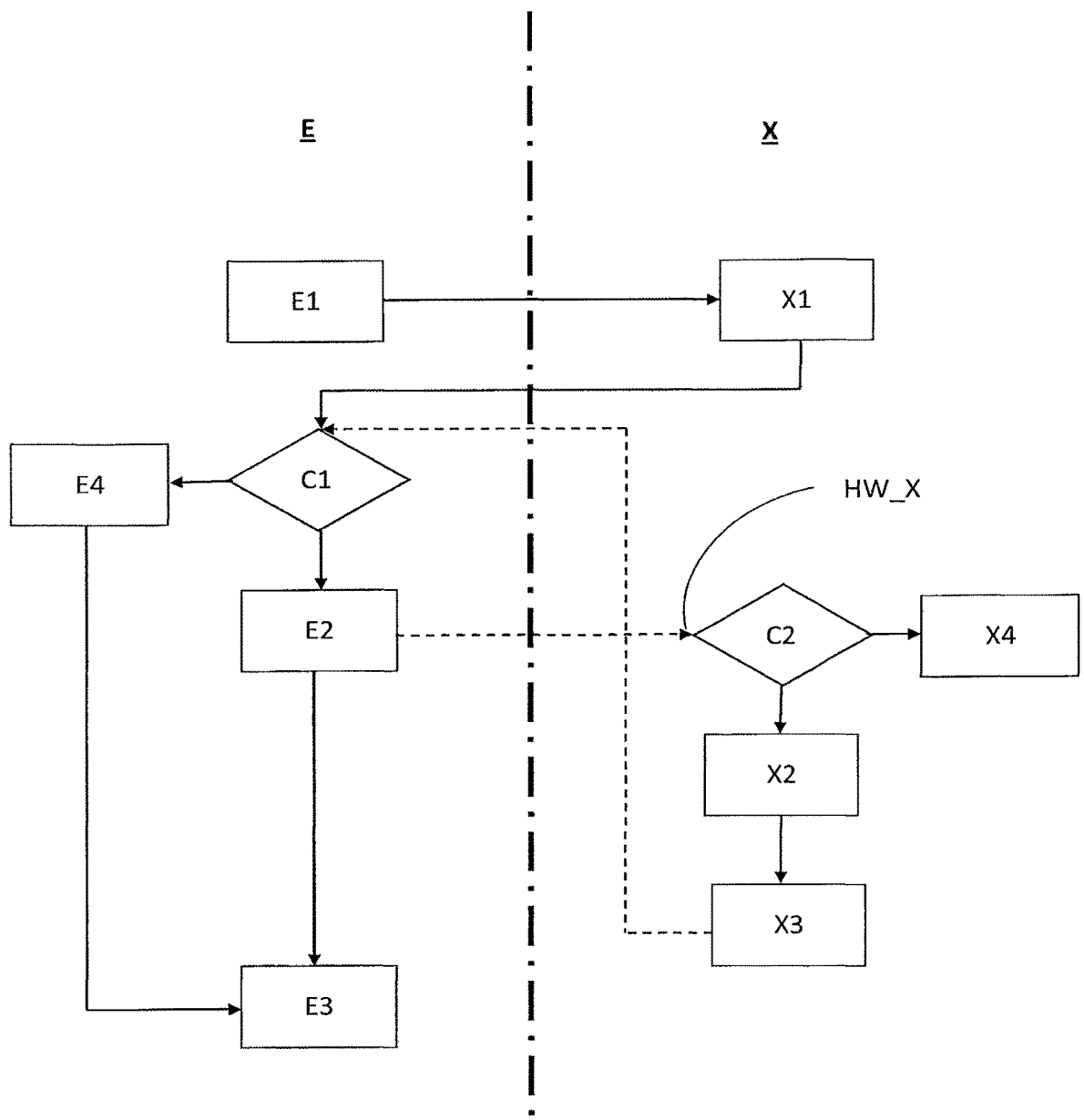

METHOD FOR DETECTING AN UNCORRECTABLE ERROR IN A NON-VOLATILE MEMORY OF A MICROCONTROLLER

CROSS REFERENCE TO RELATED APPLICATIONS

This application is the U.S. National Phase application of PCT International Application No. PCT/EP2016/001443, filed Aug. 26, 2016, which claims priority to French Patent Application No. 1558019, filed Aug. 28, 2015, the contents of such applications being incorporated by reference herein.

FIELD OF THE INVENTION

The invention relates to the field of embedded microcontrollers. Recent microcontrollers exhibit a non-volatile memory, also called read-only memory, such as Flash memory, in which data are stored. These data are associated with an error correction code, designated by the acronym ECC, so as to guard said microcontrollers against any corruption of the data stored in their non-volatile memory.

BACKGROUND OF THE INVENTION

However, uncorrectable errors may arise, and the microcontrollers then generate an exception when reading an uncorrectable error such as this.

In this context, the present invention relates to a method making it possible to detect, to locate, and to handle the arising of an uncorrectable error in a non-volatile memory of any type of microcontroller.

As is known, automotive vehicles, like any other type of vehicle, comprise computers comprising microcontrollers that are able to execute embedded software.

To this end, said microcontrollers exhibit volatile or non-volatile data storage means. Such microcontrollers thus exhibit a volatile memory, also called random-access memory, typically memory of RAM type, the acronym, well known to the person skilled in the art, standing for Random Access Memory. Moreover, for lasting data storage, microcontrollers also exhibit a non-volatile memory, typically memory of Flash type, well known to the person skilled in the art. Flash memory is in particular used for backing up the software of the microcontroller, the "firmware" according to the term well known to the person skilled in the art, and for data backup relating to the life cycles of the microcontroller and of its embedded software.

In practice, when the software embedded in the microcontroller is executed, the latter reads the Flash memory so as to thereafter allow the implementation of "high-level" application software and the proper execution of the decisional functions that it comprises.

As regards non-volatile memory, it is well known that Flash memory is used a great deal, because of its economic competitivity and its compactness.

A known problem related to the use of Flash memory resides however in the difficulty in ensuring the consistency of the data stored therein. According to the prior art, as mentioned briefly hereinabove, there exist microcontrollers with Flash memory, in which the backed-up data are associated with an error correction code, known by the acronym ECC.

By virtue of the associating of the data backed up in the Flash memory with an error correction code, the prior art makes it possible to detect and to process a large part of the errors relating to an inconsistency of the data read in Flash memory.

However, among the errors which may arise when reading data in Flash memory, some are not correctable. In this case, when, in the course of execution, a microcontroller attempts to read a datum corresponding to an uncorrectable error, the microcontroller raises an exception which, according to the prior art, generally brings about the restarting of the microcontroller. Indeed, according to the prior art, when an exception is raised while reading data in Flash memory, following the arising of an uncorrectable error, it is not possible to restore a stable state of the microcontroller, prior to the arising of the uncorrectable error, the parameters constituting the low-level context of said stable microcontroller, the state of the internal registers, of the stack pointer, of the address registers, . . . etc., being lost.

Thus, more precisely, according to the prior art, when a microcontroller receives the instruction to read a datum in Flash memory, it implements a reading interface able to execute the read instruction. Said reading interface is in practice a function of the "driver" of the microcontroller. The "driver" handles, in particular, all the requests to read and write data arising from the application software implemented by the computer comprising the microcontroller concerned. When said microcontroller, in practice said reading interface, is confronted with an uncorrectable error, such as a nonexistent instruction or an irretrievably corrupted datum, said microcontroller raises an exception via an exception handler. Said exception, in general, brings about the restarting of the microcontroller.

The technical problem which ensues from this behavior of the reading interface cooperating with the exception handler, in known microcontrollers, resides in the fact that, in the case where an uncorrectable error is due to corruption of a memory area of the Flash memory, the exception is raised loop-wise and this brings about loop-wise restarting of the microcontroller and of the computer concerned. In practice, after several consecutive restarts of a critical computer, an automotive vehicle in which this type of malfunction were to arise would be disabled by the engine control and not restartable without the intervention of a technician.

According to a known technique, certain specific microcontrollers, necessarily exhibiting fixed-size function call contexts stored in a dedicated stack, exhibit an exception handler capable, on prior request, of returning the software of the microcontroller to a higher function than the calling of the reading interface that prompted an exception because of an error identified as uncorrectable, without giving rise to a restart of the microcontroller. However, this known solution is not applicable to many microcontrollers, in particular not comprising any fixed-size function call contexts stored in a dedicated stack.

SUMMARY OF THE INVENTION

A need therefore exists for a method for handling the uncorrectable errors arising in a non-volatile memory, of Flash type, of a microcontroller integrated into an embedded computer, in particular in the context of an automotive vehicle.

An aspect of the present invention consequently relates to a method improving the reading interface configured to read the Flash memory of an embedded microcontroller and cooperating with an exception handler. In particular, the method according to an aspect of the invention enables the handling of uncorrectable errors present in Flash memory, without giving rise to a restart, while allowing the identification of a corresponding corrupted memory area, and while being compatible moreover with any type of microcontroller.

The method for detecting and handling an uncorrectable error in a non-volatile memory of an embedded microcontroller, according to an aspect of the invention, indeed rests on the fact that the exception handler of a microcontroller is able to raise exceptions when actually necessary, and only when actually necessary, in accordance with the particularly demanding constraints which apply to the manufacturers of microcontrollers.

More precisely, the method according to an aspect of the invention provides for the performing of a backup of the low-level context of the microcontroller, before any reading of data in Flash memory, so as to allow the restoration of said low-level context in case an exception is raised when reading a datum in a corrupted memory area, thus avoiding, in cases where it is not absolutely necessary, the restarting of the microcontroller.

For this purpose, an aspect of the invention relates to a method for detecting and handling an uncorrectable error in a non-volatile memory of a microcontroller, said microcontroller exhibiting a reading interface, an exception handler, and a set of internal registers and of execution parameters constituting a low-level context of said microcontroller, said method comprising the following steps:
  i. upon each command of an operation of reading, to be performed by the reading interface, of a datum in a memory area of the non-volatile memory, the systematic activation of a specific strategy of uncorrectable error detection and handling in the non-volatile memory, said strategy comprising the following steps:
  ii. the recording in a volatile memory of the microcontroller of the state of the internal registers and of the execution parameters constituting the low-level context of said microcontroller;
  iii. the reading of the datum in the non-volatile memory;
  iv. if an exception is raised by the exception handler when reading said datum, the restoration by said exception handler of the state of the internal registers and of the execution parameters constituting the low-level context of the microcontroller, such as are recorded in memory in step ii., the invalidation of the memory area and the deactivation of the specific strategy of uncorrectable error detection and handling;
  v. if no exception is raised by the exception handler when reading the datum, the deactivation of the specific strategy of uncorrectable error detection and handling, after reading of said datum.

The internal registers comprise for example a data register and an address register.

The execution parameters comprise for example a stack pointer of the microcontroller.

According to a preferred embodiment, said non-volatile memory is a Flash memory.

According to a preferred embodiment, said volatile memory is a RAM memory.

In a preferred manner, if an exception is raised by the exception handler when reading the datum in the non-volatile memory, step iv. comprises an initial substep comprising:
  the performing of a verification test by the exception handler to verify that the specific strategy of uncorrectable error detection and handling is active and that said exception is due exclusively to the detection of an uncorrectable error; and
  if said strategy is not active, the restarting of the microcontroller.

By virtue of this embodiment, the method according to an aspect of the invention is able to handle the case where an exception arises independently of a call to the reading interface; in this case, immediate restarting of the microcontroller is provided for, without restoration of the low-level context of the microcontroller.

Advantageously, the method according to an aspect of the invention comprises, on completion of step iv., the performing of a return, in the form of an absolute jump, so as to return to the exit of step ii.

According to a preferred embodiment, prior to step iii. of reading the datum in the non-volatile memory in a determinable area of said non-volatile memory, the method according to the invention provides for:
  the performing of a test to verify whether an exception has been raised by the exception handler, having brought about the performing of a return, in the form of an absolute jump, so as to return to the exit of step ii.;
  if an exception having brought about the performing of a return, in the form of an absolute jump, so as to return to the exit of step ii. has indeed been raised, the invalidation of said area of the non-volatile memory, in such a way that the reading interface no longer attempts to access said area of the non-volatile memory;
  if no exception having brought about the performing of a return, in the form of an absolute jump, so as to return to the exit of step ii. has been raised, the continuation of the method with step iii.

Advantageously, step iv. furthermore comprises the transmission to the reading interface by the exception handler of an item of information according to which an uncorrectable error has arisen.

Advantageously, said item of information comprises an identification of the area of the non-volatile memory exhibiting the uncorrectable error and presumed corrupted.

An aspect of the invention relates moreover to an embedded microcontroller device, intended for an automotive vehicle computer, said microcontroller comprising a microprocessor and a non-volatile memory, and said microcontroller being noteworthy in that it is configured to implement the method for detecting and handling an uncorrectable error in the non-volatile memory of the microcontroller such as briefly described hereinabove.

BRIEF DESCRIPTION OF THE DRAWINGS

The invention will be better understood on reading the description which follows, given solely by way of example, and referring to the appended drawing which represents a logic diagram showing the steps of the method according to an aspect of the invention, in accordance with a preferred embodiment.

DETAILED DESCRIPTION OF THE PREFERRED EMBODIMENTS

An aspect of the invention is presented mainly with a view to an application to microcontrollers implemented in computers embedded on board automotive vehicles. However, other applications are also envisaged by the present invention, in particular with a view to an application to microcontrollers implemented in computers embedded on board any type of vehicle, terrestrial or not.

Furthermore, mention is generally made, in the subsequent description, of an application of the method according to an aspect of the invention to the handling of uncorrectable errors in a Flash memory; however, the method according to an aspect of the invention can be implemented for any type of non-volatile memory.

In the context already presented above, in which an embedded microcontroller has a non-volatile memory, typically of Flash type, an aspect of the present invention is aimed at detecting and handling in an optimal manner the uncorrectable errors which may arise when reading data in said non-volatile memory.

The Flash memory of an embedded microcontroller indeed comprises critical data, including low-level software allowing the operability of the microcontroller, namely firmware according to the term customarily used and well known to the person skilled in the art, as well as backup data, recorded during the life cycles of the microcontroller and used by the software of said microcontroller.

According to the prior art, as explained in the preamble, the data recorded in Flash memory are associated with an error correction code and the reading interface ensuring the reading of the data in Flash memory is able to detect and correct a great majority of the errors automatically.

However, certain errors are not correctable and bring about the raising of exceptions by an exception handler. In the general case, the arising of an exception brings about the restarting of the microcontroller, and therefore of the computer which hosts it.

When an area of the Flash memory is corrupted, the microcontroller may then be in a loop-wise restarting state. In the context of an automotive vehicle, after several successive restarts of a computer, the vehicle is compelled to stop.

An aspect of the present invention proposes a method allowing the detection of uncorrectable errors, their handling without restarting of the microcontroller, as well as the location of the corrupted memory area, if relevant.

To this end, the method according to an aspect of the invention is aimed at improving the reading interface ensuring the reading of the data in Flash memory, as well as the exception handler with which it cooperates.

In FIG. 1, the steps and condition situated on the left are implemented or verified by the reading interface E of the microcontroller, while the steps and condition situated on the right are implemented or verified by the exception handler X of the microcontroller.

Thus, with reference to FIG. 1, the method for detecting and handling uncorrectable errors in non-volatile memory of a microcontroller, in accordance with an aspect of the invention, exhibits firstly a step E1 corresponding to the activation of a specific strategy intended to allow the detection and the handling of an uncorrectable error in the non-volatile memory of the microcontroller. This step E1 of activating the specific strategy is systematically activated upon any call to the reading interface, stated otherwise upon any engagement of an operation of reading data in Flash memory.

On completion of the reading operation, the method according to the invention provides for a step E3 of deactivating the specific strategy.

The benefit of this systematic activation as first step E1 of an operation of data reading in Flash memory and of this systematic deactivation as last step E3 of said operation of data reading in Flash memory resides in the fact that this makes it possible to maintain the ability to force a restart of the microcontroller when an exception arises outside of any operation of reading data in memory, for example because an independent function, that has not called the reading interface of the "driver" of the microcontroller, has come to read a corrupted datum.

As soon as the activation of the specific strategy of uncorrectable error detection and handling in the Flash memory of the microcontroller, in step E1, is accomplished, the method according to an aspect of the invention provides for the backing up of the low-level context of the microcontroller. According to the preferred embodiment, this backup is performed by the exception handler, in step X1 in FIG. 1, before any actual reading of a datum in Flash memory, and immediately after activation of the specific strategy.

By "low-level context" is meant the set of internal registers of said microcontroller, such as the data registers, the address registers, the register listing the function return addresses, and any parameter such as the state of the stack pointer, that is to say, in summary, the set of internal registers and parameters constituting the microcontroller execution context.

The state of the set of internal registers and parameters constituting the low-level context of the microcontroller is backed up by the exception handler in a separate memory from the non-volatile memory concerned, for example a volatile memory, typically the random-access memory, of RAM type, of the microcontroller. Said memory in which the low-level context of the microcontroller is backed up in step X1 must preferably be easily modifiable, so as to be able to write thereto without having to modify said low-level context of the microcontroller. This memory intended to receive the backup of the low-level context must also, in a preferred manner, be different from that targeted by the reading interface, so as to avoid conflicts of errors in the extreme case where the writing of the backup of the low-level context of the microcontroller would bring about uncorrectable errors. In practice, preferably, the random-access memory of the microcontroller, of RAM type, is thus used for the writing of the backup of the low-level context of the microcontroller.

It should be noted that most particular attention must be paid to the implementation of the function for backing up the low-level context of the microcontroller by the exception handler, so that said backup does not bring about a modification, by the calling and execution thereof, of said low-level context of the microcontroller, that is to say of most of the address registers and data registers, of the stack pointers, of the parameters constituting the microcontroller execution context . . . etc. Furthermore, through suitable implementation thereof, the backup function uses preferably exclusively a dedicated part of the low-level context of the microcontroller, dependent on the architecture of said microcontroller and in particular the call procedure in respect of the functions implemented by said microcontroller, such as the registers for passing arguments.

Indeed, if, by calling the backup function, the low-level context were changed, the low-level context of the microcontroller would not be backed up faithfully. On the other hand, a part of said low-level context can be reserved for "local" use by a function, and can therefore thus be used for the microcontroller low-level context backup function.

The method according to an aspect of the invention thereafter implements the condition C1. The condition C1 corresponds to the verification, or not, that an exception has just been raised by the exceptions generator during a previous attempted reading of a datum in the Flash memory, said exception handler then having caused an absolute jump in the execution of the reading operation by the reading interface to the state which said operation was in before the attempted reading of a datum in Flash memory, said absolute jump being provided for in step X3, described hereinafter.

If no exception has been raised at this juncture, the reading interface reads the envisaged data in Flash memory, corresponding to step E2 in FIG. 1.

Thereupon, according to an aspect of the invention, if a hardware exception HW_X arises during the attempted reading of a datum in Flash memory, said datum being stricken with an uncorrectable error, then the condition C2, relating to the verification by the exception handler that the specific strategy of uncorrectable error detection and handling in the Flash memory is active or inactive, is tested.

If the exception handler finds that said strategy is not active, then the microcontroller is restarted (step X4 in the logic diagram of FIG. 1) since the hardware exception is due to an error independent of the call to the reading operation in progress. If the exception handler finds that said strategy is indeed active, then the exception handler restores the low-level context backed up previously (step X2 in FIG. 1) and engenders an absolute jump (step X3 in FIG. 1) of the reading operation so as to place the reading interface and the microcontroller back in the state they were in on exiting step E1, that is to say after activation of the specific strategy and before the attempted actual reading of data in Flash memory.

The condition C1 is then (re)verified. If an exception has indeed been generated by the exceptions generator, the method according to an aspect of the invention provides that the memory area which was envisaged by the reading operation, being identified, is "invalidated", so that the reading interface no longer attempts to access said memory area, corresponding to step E4 in the logic diagram of FIG. 1.

In this manner, the hardware exception that has arisen because a corrupted memory area has induced an uncorrectable error has been interpreted and handled without bringing about a restart of the microcontroller, by virtue of the method according to the invention.

Furthermore, by way of the test C2, the method according to an aspect of the invention provides for the possibility that an exception caused by a function independent of a reading operation implemented by the appropriate reading interface may engender a restart of the microcontroller, when the specific strategy of uncorrectable error detection and handling in memory is not activated. Indeed, if said strategy is not active, then the low-level context of the microcontroller has not been backed up and therefore cannot be restored. Therefore, the only conceivable action is the restarting of the microcontroller.

Moreover, the method according to an aspect of the invention may provide, optionally, that in case said method were implemented in the context of a pre-emptive environment, in which the reading interface is implemented in a critical area, the prohibiting of access to the Flash memory, by intercepting any call not passing through the appropriate reading interface, when such calls would occur after activation, and before deactivation, of the specific strategy of uncorrectable error detection and handling in Flash memory.

To summarize, an aspect of the present invention relates to a method able to detect and to handle the arising of an exception caused by an uncorrectable error present in non-volatile memory of a microcontroller, without causing restarting of said microcontroller.

The method according to an aspect of the invention, to express it in a synoptic manner, makes provision to test the integrity of the non-volatile memory before attempting to read it, and then, if an exception occurs, to cause a "jump to the past" so as to allow the reading interface to avoid the corrupted memory area. To this end, a specific strategy must be activated on launching any reading operation, and deactivated on completion of said reading operation. Right from said activated strategy, the exception handler produces a "photograph" (backup) of the low-level context of the microcontroller, that it backs up, and restores, if relevant, if an exception arises when reading a datum in memory, because of the presence of an uncorrectable error in a corrupted memory area.

It should be noted, furthermore, that the invention is not limited to the embodiment described by way of example and that variants within the scope of the person skilled in the art may be envisioned.

The invention claimed is:

1. A method for detecting and handling an uncorrectable error in a non-volatile memory of a microcontroller, said microcontroller comprising a reading interface, an exception handler, and a set of internal registers and execution parameters constituting a low-level context of said microcontroller, said method comprising the following steps:
   i. upon each command of a reading operation, to be performed by the reading interface, of a datum in a memory area of the non-volatile memory, a systematic activation of a specific strategy of uncorrectable error detection and handling in the non-volatile memory, said strategy comprising the following steps:
   ii. recording in a volatile memory of the microcontroller of a state of the internal registers and of execution parameters constituting the low-level context of said microcontroller;
   iii. reading of the datum in the non-volatile memory;
   iv. if an exception is raised by the exception handler when reading said datum,
      a) restoring by said exception handler of the state of the internal registers and of the execution parameters constituting the low-level context of the microcontroller, recorded in memory in step ii.,
      b) invalidating the memory area and
      c) deactivating the specific strategy of uncorrectable error detection and handling;
   v. if no exception is raised by the exception handler when reading the datum, deactivating the specific strategy of uncorrectable error detection and handling, after reading said datum, and
   vi. on completion of step iv., performing a return, in the form of an absolute jump,
   so as to return to the strategy after step ii. is executed,
   wherein prior to step iii. reading the datum in the non-volatile memory in a determinable area of said non-volatile memory:
   performing a test to verify whether an exception has been raised by the exception handler, having brought about the performing of a return, in the form of an absolute jump, so as to return to the strategy after step ii. is executed;
   if an exception having brought about the performing of a return, in the form of an absolute jump, so as to return to the strategy after step ii. is executed has been raised, the invalidation of said area of the non-volatile memory, in such a way that the reading interface no longer attempts to access said area of the non-volatile memory; and
   if no exception having brought about the performing of a return, in the form of an absolute jump, so as to return to the strategy after step ii. is executed has been raised, the continuation of the method with step iii.

2. The method as claimed in claim 1, wherein the internal registers comprise data registers and address registers.

3. The method as claimed in claim 1, wherein the execution parameters comprise a stack pointer of the microcontroller.

4. The method as claimed in claim 1, wherein said non-volatile memory is a Flash memory.

5. The method as claimed in claim 1, wherein step iv. furthermore comprises transmitting to the reading interface by the exception handler of an item of information according to which an uncorrectable error has arisen.

6. The method as claimed in claim 5, wherein said item of information comprises an identification of the area of the non-volatile memory exhibiting the uncorrectable error and presumed corrupted.

7. An embedded microcontroller device, intended for an automotive vehicle computer, said microcontroller comprising a microprocessor and a non-volatile memory, and said microcontroller being configured to implement the method for detecting and handling an uncorrectable error in the non-volatile memory of the microcontroller as claimed in claim 1.

8. A method for detecting and handling an uncorrectable error in a non-volatile memory of a microcontroller, said microcontroller comprising a reading interface, an exception handler, and a set of internal registers and execution parameters constituting a low-level context of said microcontroller, said method comprising the following steps:
  i. upon each command of a reading operation, to be performed by the reading interface, of a datum in a memory area of the non-volatile memory, a systematic activation of a specific strategy of uncorrectable error detection and handling in the non-volatile memory, said strategy comprising the following steps:
  ii. recording in a volatile memory of the microcontroller of a state of the internal registers and of execution parameters constituting the low-level context of said microcontroller;
  iii. reading of the datum in the non-volatile memory;
  iv. if an exception is raised by the exception handler when reading said datum,
    a) restoring by said exception handler of the state of the internal registers and of the execution parameters constituting the low-level context of the microcontroller, recorded in memory in step ii.,
    b) invalidating the memory area and
    c) deactivating the specific strategy of uncorrectable error detection and handling; and
  v. if no exception is raised by the exception handler when reading the datum, deactivating the specific strategy of uncorrectable error detection and handling, after reading said datum,
wherein if an exception is raised by the exception handler when reading the datum in the non-volatile memory, step iv. comprises an initial substep comprising:
performing of a verification test by the exception handler to verify that the specific strategy of uncorrectable error detection and handling is active and that said exception is due exclusively to the detection of an uncorrectable error; and
if said strategy is not active, restarting the microcontroller.

* * * * *